Jan. 10, 1967     J. A. PETRIE ETAL     3,297,301

BLADED ROTOR FOR USE IN A FLUID FLOW MACHINE

Filed April 2, 1965

Inventors

James Alexander Petrie
Thomas Steel
By Cushman, Darby & Cushman
Attorneys

United States Patent Office 3,297,301
Patented Jan. 10, 1967

3,297,301
BLADED ROTOR FOR USE IN A
FLUID FLOW MACHINE
James Alexander Petrie and Thomas Steel, Littleover, Derby, England, assignors to Rolls-Royce Limited, Derby, England, a company of Great Britain
Filed Apr. 2, 1965, Ser. No. 445,121
Claims priority, application Great Britain, Aug. 11, 1964, 32,751/64
4 Claims. (Cl. 253—39.15)

This invention concerns a bladed rotor adapted for use in a fluid flow machine such, for example, as a gas turbine engine.

According to the present invention, there is provided a bladed rotor which is adapted for use in a fluid flow machine, e.g. a gas turbine engine, which has a disc (or other blade support structure) whose periphery is provided with a plurality of recesses which are arranged circumferentially adjacent to each other around the said periphery, each recess having a curvilinear profile, the gradient of the curve passing through only one reversal of direction. The rotor is provided with a plurality of angularly spaced apart blades, each blade having a root portion which is a close fit in, and is secured in one of the recesses. The circumferential width of each region of the rotor between adjacent recesses, at the radially outer end of said region, being less than one-quarter of the circumferential width of each recess at its radially outer end, whereby parts of the periphery between adjacent recesses will, in operation, have a reduced tendency to crack due to hoop stresses.

It will be appreciated that if there should be a peripheral crack in the said disc (or the other blade support structure) between adjacent recesses, this crack will not be opened up by the hoop stresses. The invention therefore provides a simple means of overcoming the effects of such a crack without the need to provide heavy and/or elaborate structure for this purpose.

Preferably the said recesses are substantially semi-circular in cross-section.

The blades have preferably been electron beam welded into the recesses.

The disc (or the other blade support structure) and the root portions of the blades may be respectively provided with aligned cavities which together form a chamber which is adapted to be supplied with a cooling fluid, each blade having at least one cooling passage therein communicating with the respective chamber.

The invention also comprises a gas turbine engine provided with a bladed rotor (e.g. a turbine rotor) as set forth above.

Figure 1:
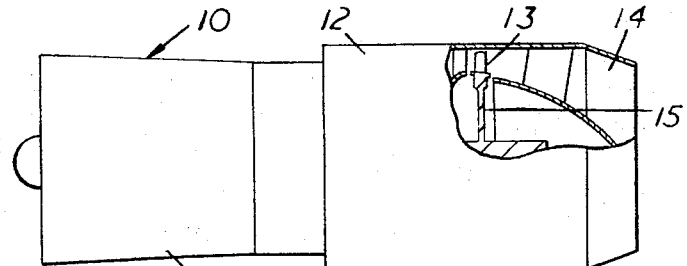
Figures 2, 3:
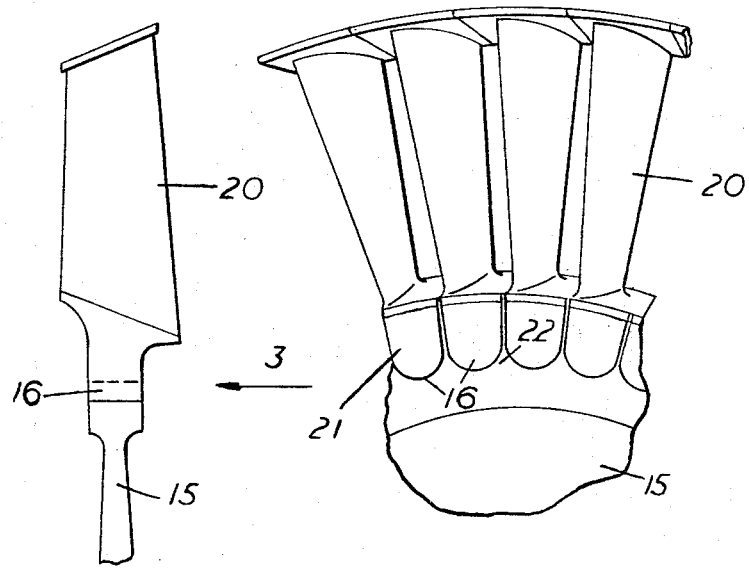
Figure 4:
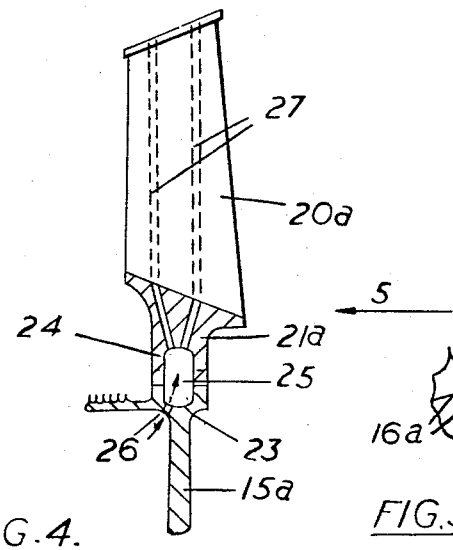
Figure 5:
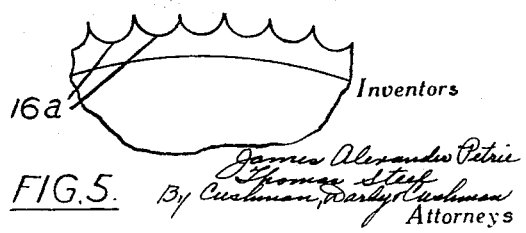

The invention is illustrated, merely by way of example, in the accompanying drawings, in which:

FIGURE 1 is a diagrammatic part-sectional view of a gas turbine engine provided with a bladed rotor according to the present invention, FIGURE 2 shows part of the said bladed rotor on an enlarged scale, FIGURE 3 is a view looking in the direction of the arrow 3 of FIGURE 2, FIGURE 4 is a view similar to FIGURE 2 but illustrating a modification, and FIGURE 5 is a view looking in the direction of the arrow 5 of FIGURE 4.

In FIGURE 1 there is shown a gas turbine engine 10 which is adapted for use as a vertical lift engine and which has a thrust to weight ratio of at least 8:1. The engine 1 comprises in flow series a compressor 11, combustion equipment 12, and a turbine 13, the turbine exhaust gases being directed to atmosphere through an exhaust duct 14.

The turbine 13 has a rotor disc 15 whose periphery is provided with a plurality of continuously curved recesses 16 (FIGURES 2 and 3) which are substantially semi-circular in cross-section and which are arranged adjacent to each other around the periphery of the disc 15. The rotor disc 15 is also provided with a plurality of angularly spaced apart blades 20 each of which has a root portion 21 which is a close fit in, and is electron beam welded in, a recess 16.

Accordingly if there should be a crack in any one peripheral part 22 of the disc 15 between adjacent recesses 16, this crack will have, in operation, a reduced tendency to be opened up by hoop stresses since the part 22 will be substantially free of such hoop stresses. The absence of discontinuities in the shape of the recesses 16 will also make it less likely that cracks will start therein.

In the construction of FIGURES 4 and 5, a rotor disc 15a, having blades 20a, has a periphery provided with a plurality of continuously curved recesses 16a in each of which is electron beam welded a blade root portion 21a which is a close fit therein. The disc 15a and the root portion 21a are respectively provided with aligned cavities 23, 24 which together form a chamber 25. Each chamber 25 communicates, via a hole 26 in the disc 15a, with a supply of cooling air from the compressor 11. Each blade 20a is, moreover, provided with cooling passages 27 communicating with the respective chamber 25 so as to receive cooling air therefrom.

We claim:

1. A bladed rotor which is adapted for use in a gas turbine engine, said rotor having a disc whose periphery is provided with a plurality of recesses arranged circumferentially adjacent to each other around the said periphery, each recess having a curvilinear profile with a gradient of its curve passing through only one reversal of direction, said rotor further having a plurality of angularly spaced apart blades, each blade having a root portion which is a close fit in, and is secured in one of said recesses, said rotor having a circumferential width in each region between adjacent recesses which at its radially outer end is less than one-quarter of the circumferential width of each of said recesses at its radially outer end, whereby parts of said periphery between adjacent recesses will, in operation, have a reduced tendency to crack due to hoop stresses.

2. A bladed rotor as claimed in claim 1 in which the recesses are substantially semi-circular in cross section.

3. A bladed rotor as claimed in claim 1 in which the root portions have been electron beam welded into the recesses.

4. A bladed rotor as claimed in claim 1 wherein the recesses of said disc and the root portions of the blades are respectively provided with aligned cavities which together form a chamber which is adapted to be supplied with cooling fluid, and each blade having at least one cooling passage therein communicating with the respective chamber.

References Cited by the Examiner
UNITED STATES PATENTS

| 2,769,611 | 11/1956 | Schwarzkopf | 253—39 |
| 2,773,169 | 12/1956 | Lees | 253—39 X |

FOREIGN PATENTS

| 886,676 | 8/1953 | Germany. |
| 335,841 | 10/1930 | Great Britain. |
| 648,234 | 1/1951 | Great Britain. |
| 588,516 | 2/1959 | Italy. |

MARTIN P. SCHWADRON, *Primary Examiner.*
EVERETTE A. POWELL, JR., *Examiner.*